US006946184B2

(12) United States Patent
Robbins, III

(10) Patent No.: US 6,946,184 B2
(45) Date of Patent: *Sep. 20, 2005

(54) DESK CHAIR MAT

(76) Inventor: Edward S. Robbins, III, 2802 Avalon Ave., Muscle Shoals, AL (US) 35661

( * ) Notice: Subject to any disclaimer, the term of this patent is extended or adjusted under 35 U.S.C. 154(b) by 41 days.

This patent is subject to a terminal disclaimer.

(21) Appl. No.: 10/439,691

(22) Filed: May 16, 2003

(65) Prior Publication Data

US 2004/0229011 A1 Nov. 18, 2004

(51) Int. Cl.[7] .................................................. B32B 3/26
(52) U.S. Cl. ....................................................... 428/120
(58) Field of Search .......................................... 428/120

(56) References Cited

U.S. PATENT DOCUMENTS 4,340,633 A 7/1982 Robbins, Jr.
4,415,946 A * 11/1983 Pitts ........................... 361/212
4,448,625 A 5/1984 Carrera
4,472,471 A 9/1984 Klein et al.
4,590,120 A 5/1986 Klein
4,784,888 A 11/1988 Schwertner et al.
4,885,659 A 12/1989 Nowell et al.
5,170,526 A 12/1992 Murray
5,227,214 A 7/1993 Kerr et al.
5,807,021 A 9/1998 Aaron
6,177,165 B1 1/2001 Robbins, III et al.
6,183,833 B1 2/2001 Robbins, III et al.
6,238,765 B1 * 5/2001 Bailey et al. ................. 428/95
6,284,341 B1 9/2001 Robbins, III et al.
6,287,659 B1 9/2001 Robbins, III et al.
6,308,842 B1 10/2001 Robbins, III et al.
6,319,592 B1 * 11/2001 Ney et al. ................ 428/195.1
D454,324 S 3/2002 Lu
6,475,593 B1 * 11/2002 Hattori et al. ................ 428/95
6,554,782 B2 4/2003 Robbins, III et al.
6,579,250 B2 6/2003 Robbins, III et al.

OTHER PUBLICATIONS

Definition of the term “narrow”; Websters II New Riverside University Dictionary; 1984.*

* cited by examiner

*Primary Examiner*—Alexander S. Thomas
(74) *Attorney, Agent, or Firm*—Brinks Hofer Gilson Lione

(57) ABSTRACT

A desk chair mat has a substantially planar upper surface suitable for interaction with a chair support structure, a perimeter defining an outer edge of the mat, a lower surface parallel to the upper surface. An array of blunt projections extends downwardly from the lower surface for engagement with a carpet. Each blunt projection has a smooth end surface spaced below the lower surface by a distance sufficient to penetrate into the carpet pile. The array is generally a regular pattern of the blunt projections arranged at an angle with respect to each nearest neighbor to provide resistance to any lateral movement of the mat with respect to the carpet.

10 Claims, 7 Drawing Sheets

Fig. 6
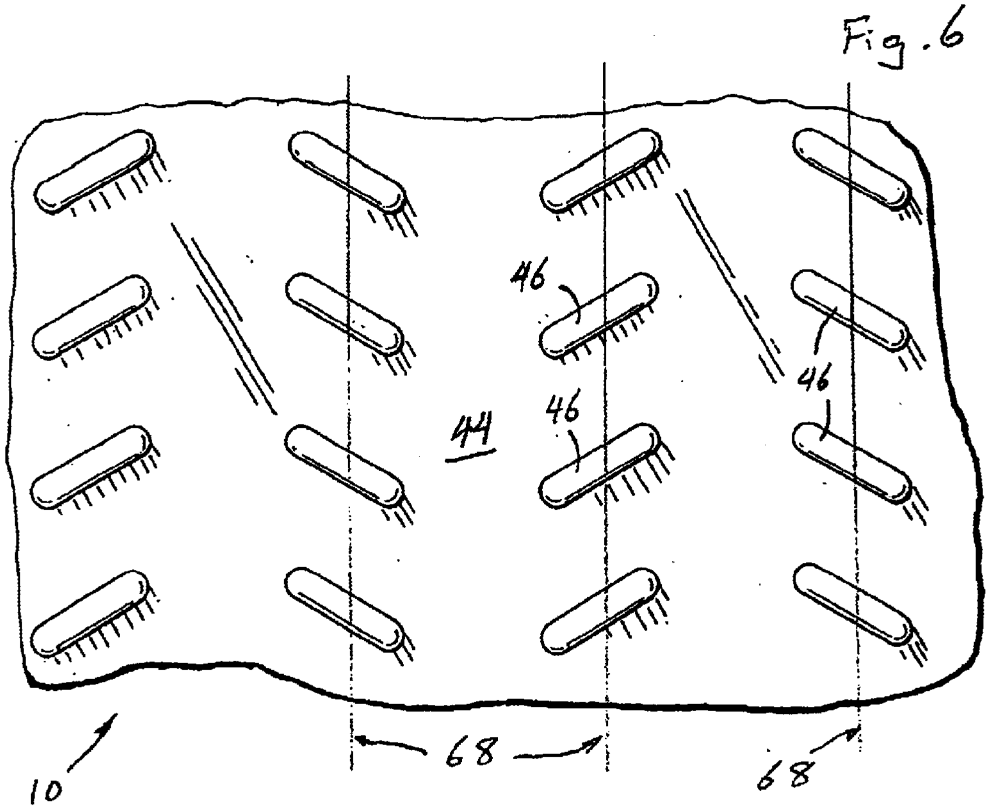
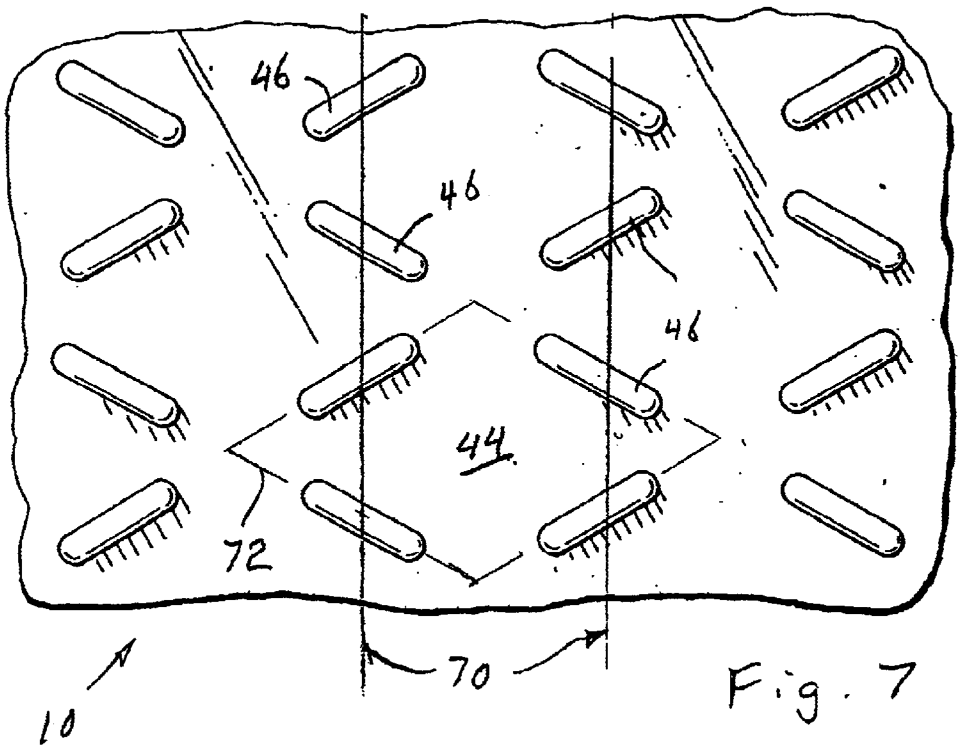
Fig. 7

DESK CHAIR MAT

BACKGROUND

The present invention is directed to chair mats and specifically, to chair mats typically used under desk chairs in order to protect an underlying carpet.

Desk chair mats for office and home use are well known. Such a chair mat has a main portion on which the desk chair rolls, and can include a forward lip portion which is adapted to extend partially into a desk well, and on which the feet of the person sitting in the chair can rest. A desk chair mat that is to be applied over carpeting is typically formed of a semi-rigid plastic, and has an array of short, sharp spikes on an underside thereof, which hold the mat firmly in place on the carpeting. While desk chair mats can be made without any spikes, the mats tend to move relative to the carpet in response to movement of any desk chair on the top surface of the mat. Thus a carpet-engaging structure is deemed necessary to achieve satisfactory performance.

Such a desk chair mat is awkward to carry and/or otherwise handle due to its size, the semi-rigid nature of the material from which it is formed, and particularly with the spikes. Unless the chair mat is boxed or otherwise protected, the user typically carries the chair mat by gripping about one or two of the edges of the chair mat, often resulting in irritation if not injury to the hands, due to the spikes projecting from the underside of the chair mat.

Attempts have been made to solve these problems by making the chair mat foldable to thereby reduce its size for handling purposes. See, for example, U.S. Pat. Nos. 4,784,888; 5,073,428 6,183,833 and 6,284,341. Further, handles have been included as a portion of the chair mat to enable safe handling. See, for example, U.S. Pat. Nos. 6,177,165; 6,287,659 and 6,308,842. Generally, desk chair mats have been sold at office supply stores or distributors as opposed to retail stores, and to some extent, the handling problem was alleviated by boxing the chair mats individually or in groups prior to shipping. Chair mats are now being found increasingly in retail outlets, compounding the problem of safe handling. While chair mats can be boxed, the boxes add cost and are themselves unwieldy, and are therefore not necessarily desirable in the retail environment. Thus, with increasing retail activity, new display schemes are also required. The last mentioned patent includes the disclosure of a retail display system designed to facilitate safer handling of chair mats.

Even when supplied from a distributor in boxed form, the end user must remove the chair mat from the box and position it at its final destination, again, with some difficulty due to the physical attributes of the chair mat. Thus the opportunity for irritation if not injury to the hands, due to the spikes projecting from the underside of the chair mat continues even after purchase. Accordingly, there remains a need for a solution to the problem of transporting desk chair mats easily and safely from the point of manufacture through the point of stocking and display in a retail environment to the point of ultimate use.

BRIEF SUMMARY

A desk chair mat of the present invention is intended for interposition between a carpet upper surface and a chair, and has a substantially planar upper surface suitable for interaction with a chair support structure that typically includes a plurality of wheels on the lower outside points of a spider. The desk chair mat has a perimeter defining an outer edge of the mat, and a lower surface parallel to the upper surface. The lower surface includes an array of blunt projections extending downwardly from the lower surface for engagement with the carpet. Each of the projections has a smooth end surface spaced below the lower surface of the desk chair mat by a distance sufficient to penetrate into the carpet upper surface, typically by about 3 mm or more. The array of blunt projections is designed to resist lateral forces acting on the desk chair mat and thereby stabilize the mat with respect to the carpet.

The array of blunt projections can assume any number of appearances. The blunt projections can be linear, angular or curved. Usually, the vertical cross-sectional aspect ratio of the blunt projections is greater that one in a first direction and less than one in a direction normal to the first direction. The smooth end surfaces of the blunt projections can be generally parallel to the lower surface of the desk chair mat or arcuate. The smooth end surface of each of the blunt projections has an area sufficient to prevent penetration of the skin of someone handling the mat, which is believed to be at least about 8 $mm^2$. The end surface of each of the blunt projections is sufficiently smooth to prevent abrasion of the skin of someone handling the mat.

The resistance to lateral forces can be achieved by arranging the blunt projections in a regular pattern wherein each projection is situated at an angle with respect to each nearest neighbor. The resistance to lateral forces can also be achieved by arranging the blunt projections in rows with the projections in adjacent rows being situated at an angle to each other. The blunt projections generally cover a majority of the lower surface of the desk chair mat, but need not extend to the perimeter. The distance between the blunt projections can vary considerably, but is typically between about 1 and 4 cm.

A desk chair mat of the present invention can be made from a suitable semi-rigid plastic such as acrylic, polycarbonate, polypropylene, or polyvinylchloride having a Rockwell hardness of between about 80 and 95, and can include static-reducing elements. A desk chair mat of the present invention can include handles and tab structures that will facilitate the handling and display of the mat. A desk chair mat of the present invention can also include a fold line or cut that will enhance ease of handling.

One advantage of a desk chair mat of the present invention is a reduction in damage to the underlying carpet since the characteristic feature of the smooth end structure of the blunt projections that inhibits irritation and injury to the hands also protects the carpet. Other features and advantages of a desk chair mat of the present invention will become apparent to those skilled in the art from a consideration of the following discussion that makes reference to the accompanying drawings.

BRIEF DESCRIPTION OF THE DRAWINGS

FIG. 6 is a bottom plan view of a portion of another desk chair mat of the present invention.

FIG. 7 is a bottom plan view of a portion of another desk chair mat of the present invention.

DETAILED DESCRIPTION OF PREFERRED EMBODIMENTS

Figure 1:
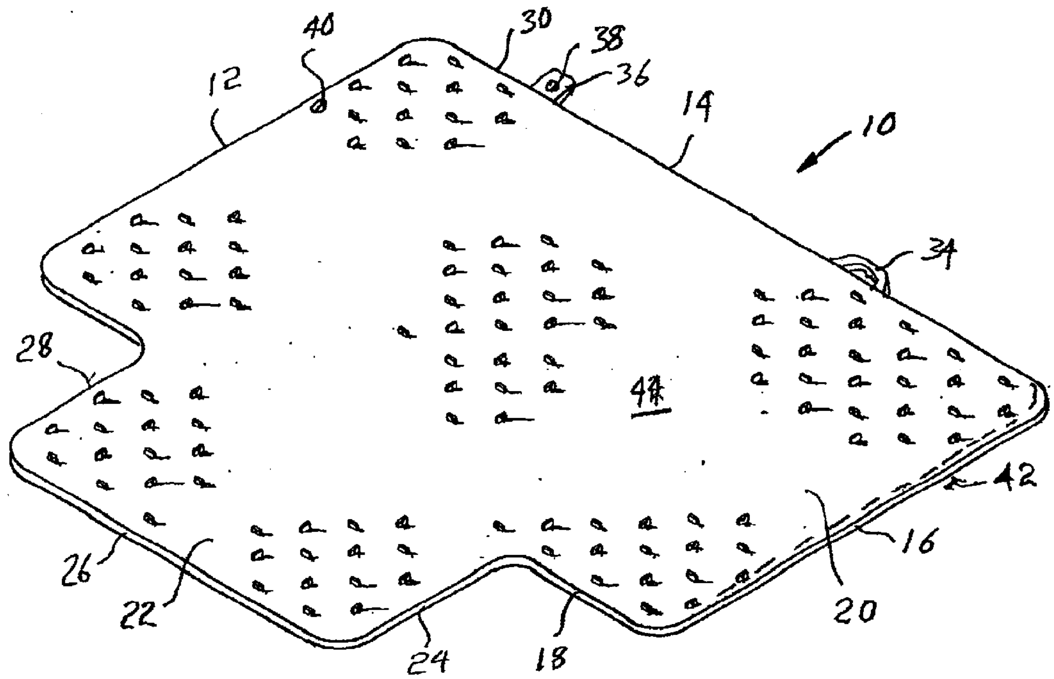
FIG. 1 is a perspective view of the lower surface of a desk chair mat of the present invention.

FIG. 1 shows a desk chair mat 10 formed of a planar, semi-rigid member (made from, e.g., PVC, polypropylene, semi-rigid vinyl or other suitable material) having four side edges 12, 14, 16 and 18, which define a major portion 20 of the chair mat 10. An optional extension portion 22 of the same material and thickness, projects or extends integrally from side edge 18, and is further defined by edges 24, 26, 28 completing the periphery 30 of the mat 10. The extension 22, as is well known, is designed to project into the well area of a desk (not shown), with the remainder of the chair mat 10 behind the desk and serving as the principal contact area for a desk chair (not shown) typically (but not necessarily) fitted with rollers or casters. The chair mat 10 for purposes of this invention, however, need not have an extension 22 of this type. The chair mat 10 can include one or more handles 34, which can project from any point on the periphery 30 of the mat 10. The chair mat 10 can also include one or more hang tabs 36 along one or more side edges of the chair mat 10, the hang tabs 36 being formed with holes or apertures 38 which enable the mat 10 to be suspended from display hooks or similar structures. Alternatively or additionally, one or more small holes 40 can be formed within the periphery 30 of the mat 10 to facilitate hanging.

Figure 2:
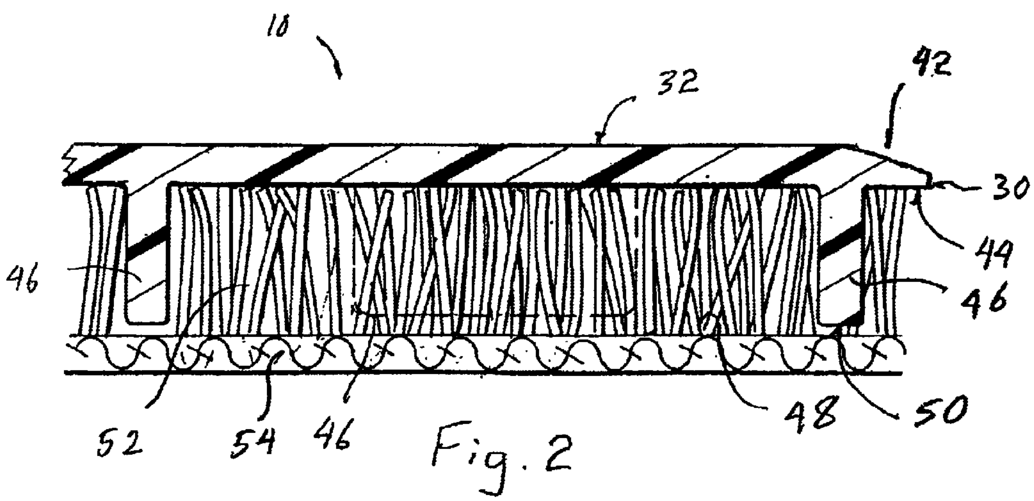
FIG. 2 is a sectional view of a desk chair mat of the present invention placed on a conventional carpet.

An upper surface 32 of the chair mat 10 is generally smooth, as shown in FIG. 2, so as to interact with the supporting structure of the desk chair. The upper surface 32 of the chair mat 10 can also be formed with a tapered marginal edge 42 that extends about the entire periphery 30 of the chair mat 10. The chair mat 10 also has a lower surface 44 that includes an array of blunt projections 46 extending downwardly from the lower surface 44 for engagement with an underlying carpet 48. The blunt projections 46 include a smooth end surface 50 spaced below the lower surface 44 by about 3 to 10 mm. In cross-section, as seen in FIG. 2, the blunt projections 46 have a height to width aspect ratio between about 2 and 4 that enables the end surfaces 50 of the blunt projections 46 to nestle into the pile 52 of the carpet, generally without contacting the carpet backing 54. A light phantom outline 52 is shown of a side view of another of the blunt projections 46 partially hidden by the pile 52 of the carpet 48.

Figure 3:
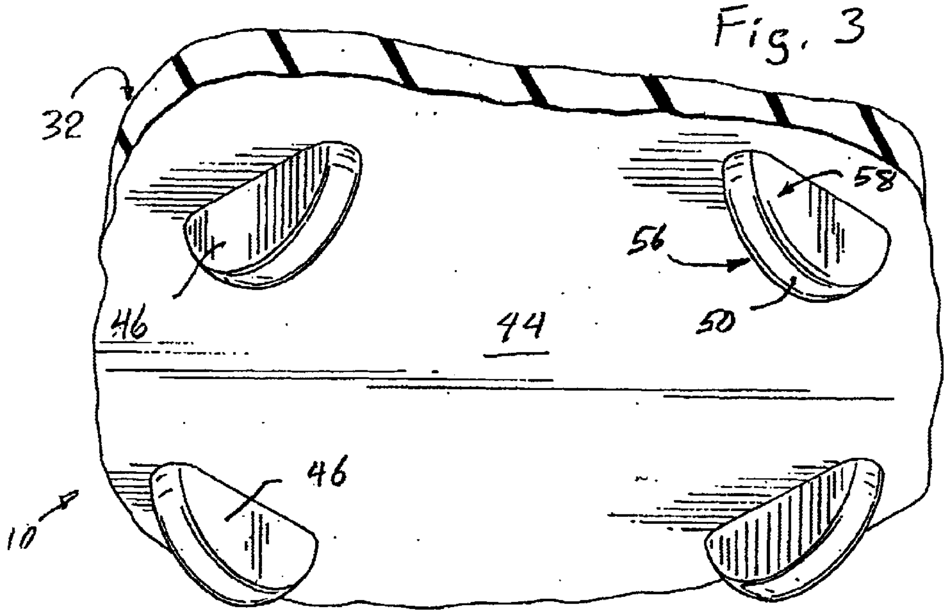
FIG. 3 is a detail perspective view of a portion of the lower surface of a desk chair mat showing several blunt projections of the present invention.
Figure 4:
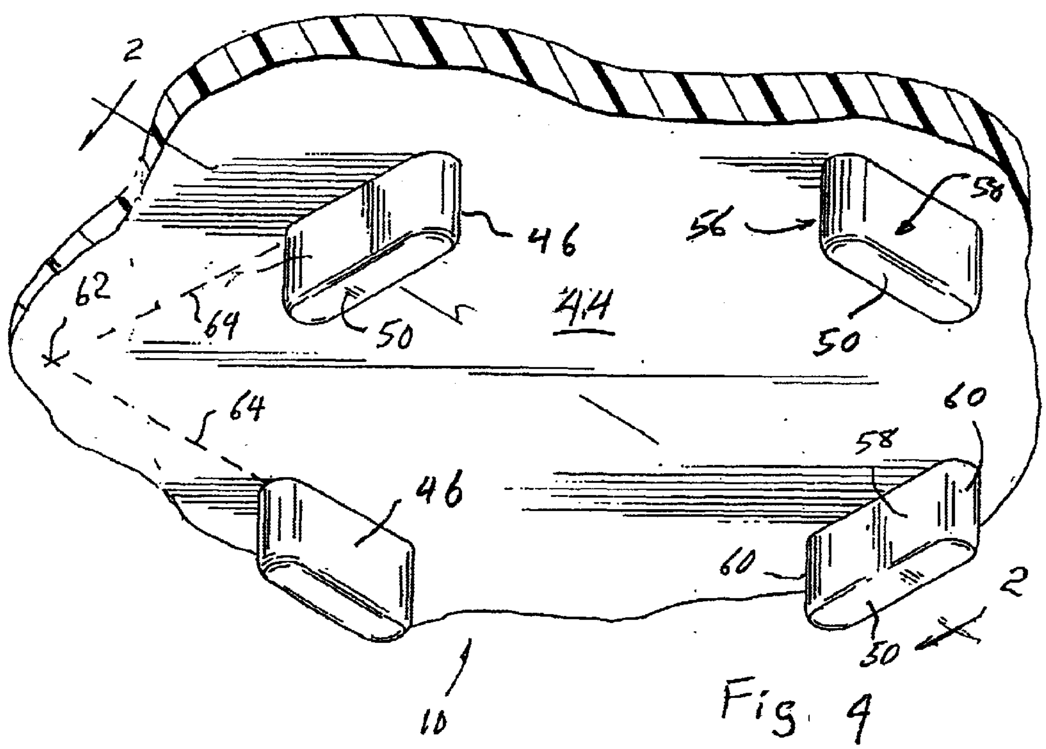
FIG. 4 is a detail perspective view of a portion of the lower surface of another desk chair mat showing several blunt projections of the present invention.

Some typical blunt projections 46 on lower surfaces 42 of a chair mat 10 of the present invention are shown in greater detail in FIGS. 2 and 3. It will be noted initially that FIG. 4 includes a section line 2—2 that indicates the direction of the cross-section shown in FIG. 2. It will be further noted that the projections 46 typically comprise a pair of generally parallel sidewalls 56 and 58 that project essentially normally from the lower surface 44 of the mat 10. The end surface 50 of the blunt projections 46 extend from one sidewall 56 to the other sidewall 58. The end surface 50 can be arcuate as shown in FIG. 3 or more flattened as shown in FIG. 4. When the end surface 50 is flattened as shown in FIG. 4, the blunt projections also include tip surfaces 60 which are shown to be rounded but can also be flattened. It is important to the present invention that the ends 50 are not pointed or sharp so that injury to both the installer and the carpeting is avoided. To achieve the desired bluntness, the area of the end surface 50 is generally at least about 8 $mm^2$.

The blunt projections 46 can be arranged in a variety of patterns. Further the blunt projections 46 can individually take a variety of shapes. Both FIGS. 3 and 4 show the blunt projections 46 arranged in a rectangular array, which can be square, wherein each blunt projection 46 forms merely a small elemental portion of the rectangle and the corners 62 of the rectangle are defined by some imaginary points located at the intersection of lines 64 projecting length wise from the tip surfaces 60.

Figure 5:
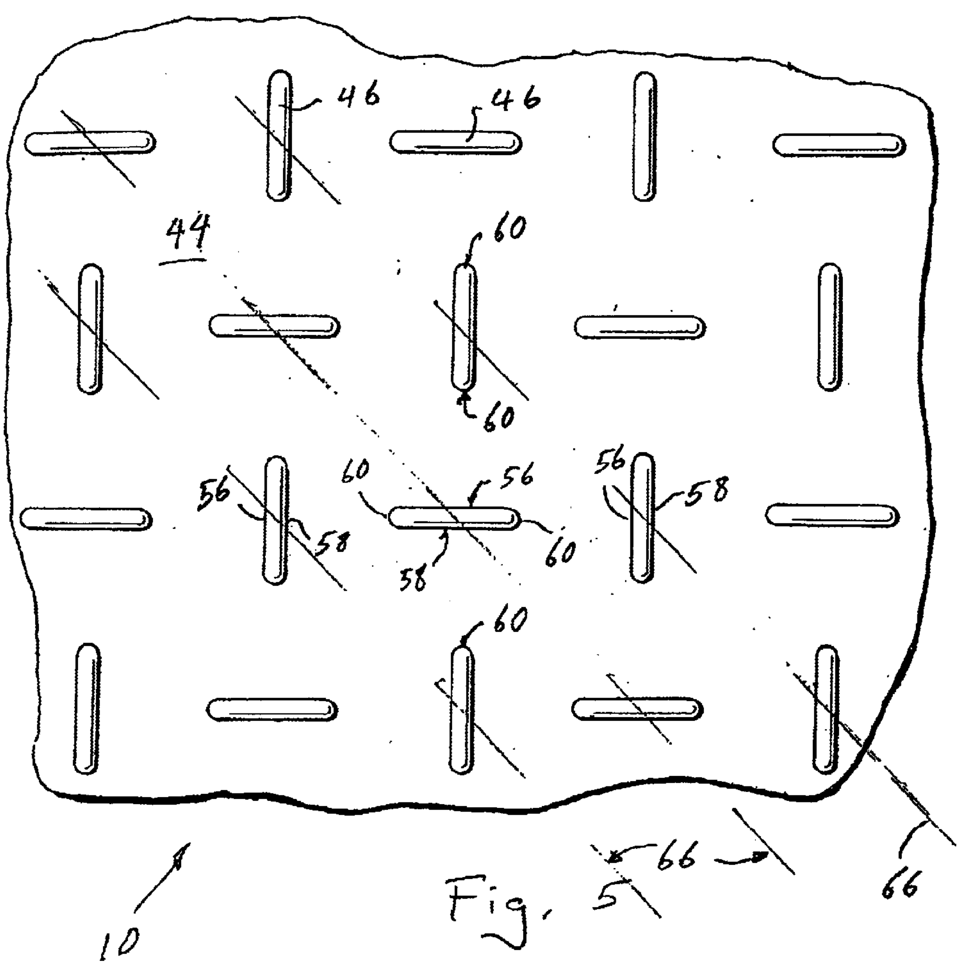
FIG. 5 is a bottom plan view of a portion of a desk chair mat of the present invention.

A variation on this rectangular array is shown in FIG. 5 in which parallel rows 66 of linear blunt projections 46 are arranged so that the tips 60 of the individual blunt projections 46 are perpendicular to the sides 56 and 58 of adjacent blunt projections 46, which results in a staggered rectangular array. The projections 46 of the array shown in FIG. 5 are somewhat closer to each other that are the projections of the arrays shown in either FIG. 3 or 4. As a rule, the distance between nearest neighbor projections 46 is generally between about 1 and 4 cm. If the spacing is dramatically smaller that this, the mat 10 can tend to ride on top of the carpet 48 rather than nestle into the pile 52 as preferred. If the spacing is dramatically larger that this, and the size of the individual projections remains substantially unchanged, the side surfaces 56 and 58 may not provide sufficient stability of the mat 10 relative to the carpet 48 to prevent creep, which is generally not desirable.

The arrays of the projections 46 need not be rectangular, for example, FIGS. 6 and 7 show the bottom surfaces 44 of mats 10 with two different arrays wherein the projections 46 are arranged in a non-perpendicular manner with respect to each other. In FIG. 6 the projections 46 are arranged in rows 68 of parallel projections 46. The projections in adjacent rows 68 are arranged at angle of about 60° with respect to each other and aligned so that the projections 46 in adjacent pairs of rows appear as a series of chevrons that are missing a middle portion. In FIG. 7, the projections 46 in each row 70 alternate orientation by an angle of about 60° so that the overall pattern defines a series of diamonds 72 outlined by the projections 46, the corners of the diamonds being located midway between the rows 70 of projections 46. The non-rectangular arrays of projections shown in FIGS. 6 and 7 still provide the desired lateral stability to the mat 10 when placed on a carpet 48.

Figure 8:
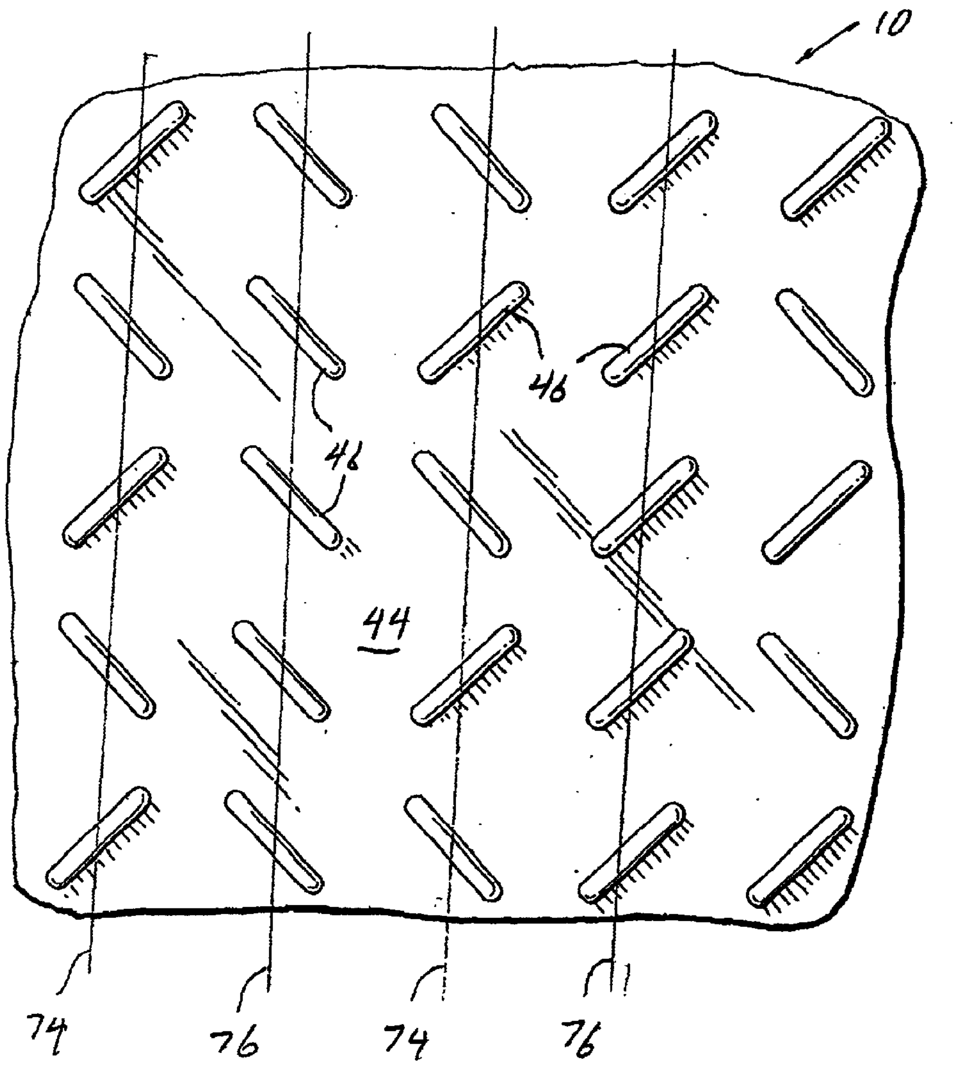
FIG. 8 is a bottom plan view of a portion of another desk chair mat of the present invention.

FIG. 8 shows yet another arrangement of the projections 46 on the bottom surface 44 of a mat 10 of the present invention that involves alternating rows 74 and 76. The projections 46 in rows 74 are placed in an alternating angular pattern with the angle between adjacent projections 46 being about 90°. The projections 46 in rows 76 are all parallel with each other, and arranged parallel to one of the two sets of projections 46 in row 74. Examined diagonally, it will be seen that the projections 46 are arranged in pairs with a first two projections being situated in a first orientation and the next two projections being situated at 90° to the first orientation.

Figure 9:
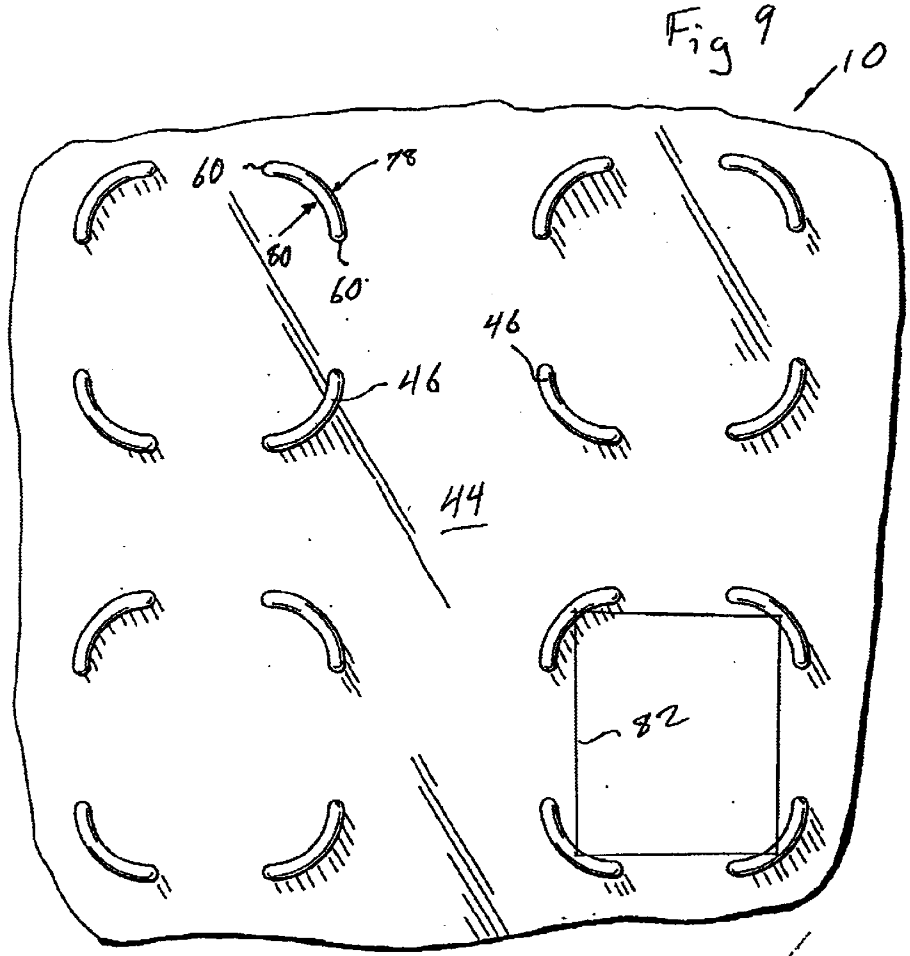
FIG. 9 is another bottom plan view of a portion of another desk chair mat of the present invention.
Figure 10:
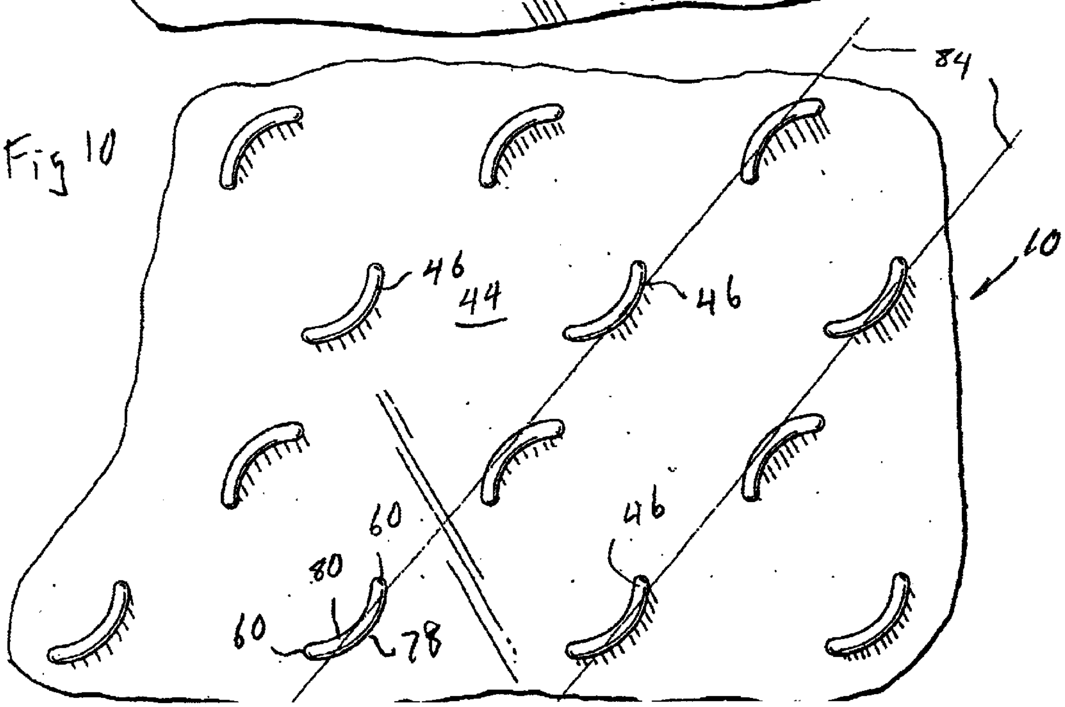
FIG. 10 is another bottom plan view of a portion of another desk chair mat of the present invention.

FIGS. 9 and 10 show the bottom surfaces 44 of mats 10 with two different arrangements of the projections 46, wherein each of the projections 46 is an arcuate element having an outside surface 78 and an inside surface 80 joined by rounded tip surfaces 60. In FIG. 9 the projections 46 arranged in rectangular sets 82 of four projections in each set. The sets 82 are then situated in a rectangular array. In FIG. 10, the arcuate projections 46 are arranged in diagonal rows 84 with the arcuate projections in each row alternating in orientation by 180°.

Figure 11:
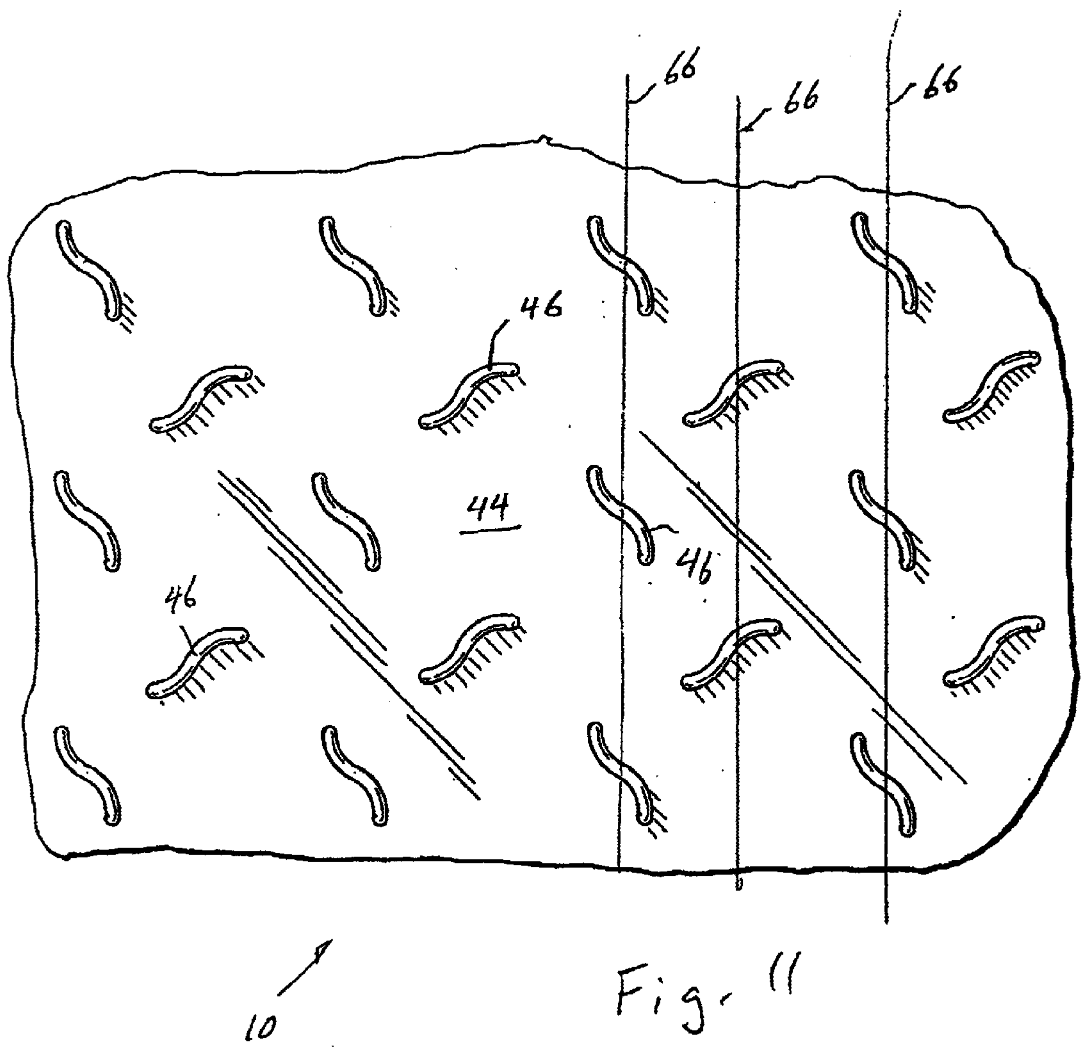
FIG. 11 is another bottom plan view of a portion of another desk chair mat of the present invention.

FIG. 11 shows the bottom surfaces 44 of mat 10 having an arrangement of blunt projections 46, wherein each of the projections is a doubly curved element in the form of an S. The arrangement of the projections 46 shown in FIG. 11 is similar to the arrangement shown in FIG. 5, but the rows 66 are perpendicular rather than diagonal. Mats 10 having the non-linear projections 46 shown in FIGS. 9–11 may be less apparent to the casual observer when situated on a carpet having a complex pattern than mats with the more linear elements shown in FIGS. 5–8, and may thus contribute to a given office appearance.

The foregoing detailed description should be regarded as illustrative rather than limiting, and the following claims, including all equivalents, define the spirit and scope of this invention.

What is claimed is:

1. A desk chair mat for interposition between a carpet and a chair, the desk chair mat comprising: a substantially planar upper surface suitable for interaction with a chair support structure, a perimeter defining an outer edge of the mat, a lower surface parallel to the upper surface, and an array of narrow width, laterally elongated, blunt projections extending downwardly from the lower surface, the blunt projections having a height to width ratio of between about 2 to 4 so as to penetrate into a carpet upper surface sufficiently to stabilize the mat with respect to the carpet, each projection having a smooth end surface spaced below the lower surface, the smooth end surface of each of the blunt projections having an area sufficient to prevent penetration of the skin of someone handling the mat.

2. The desk chair mat of claim 1 wherein the smooth end surface of each of the blunt projections is generally rectangular.

3. The desk chair mat of claim 2 wherein the smooth end surface of each of the blunt projections is generally parallel to the lower surface.

4. The desk chair mat of claim 1 wherein the smooth end surface of each of the blunt projections has an area of at least about 8 $mm^2$.

5. The desk chair mat of claim 1 wherein the smooth end surface of each of the blunt projections is spaced from the lower surface by about 3 to 10 mm.

6. The desk chair mat of claim 1 wherein the blunt projections are arrayed such that each projection is spaced from its nearest neighbor projection by between about 1 and 4 cm.

7. The desk chair mat of claim 1 wherein a vertical cross-sectional aspect ratio of the blunt projections is greater than two in a first direction and less than one in a second direction.

8. The desk chair mat of claim 7 wherein the array comprises a regular pattern of blunt projections arranged at an angle with respect to each nearest neighbor.

9. The desk chair mat of claim 8 wherein the angle is at least 30°.

10. A desk chair mat for interposition between a carpet and a chair, the desk chair mat comprising: a semi-rigid sheet of plastic having a substantially planar upper surface suitable for interaction with a chair support structure, a perimeter defining an outer edge of the mat, a lower surface parallel to the upper surface, and an array of narrow-width, laterally elongated blunt projections extending downwardly from the lower surface for engagement with a carpet, each projection having a smooth end surface spaced below the lower surface, the blunt projections having a height to width ratio of between about 2 to 4 so as to penetrate into a carpet, the array being a regular pattern of the laterally elongated blunt projections arranged at an angle with respect to each nearest neighbor to provide resistance to any lateral movement of the mat with respect to the carpet, the smooth end surface of each of the blunt projections having an area sufficient to prevent penetration of the skin of someone handling the mat.

* * * * *